US012574071B2

(12) United States Patent
Jackle et al.

(10) Patent No.: US 12,574,071 B2
(45) Date of Patent: Mar. 10, 2026

(54) DEVICE FOR THE COMMUNICATION OF AN ELECTRIC OR HYBRID VEHICLE WITH AN ELECTRIC CHARGING STATION, AND COMMUNICATION METHOD

(71) Applicant: Volkswagen Aktiengesellschaft, Wolfsburg (DE)

(72) Inventors: Nicolas Jackle, Wendeburg (DE); Wolfgang Menssen, Braunschweig (DE); Bernd Baranski, Hamburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/779,077

(22) Filed: Jul. 21, 2024

(65) Prior Publication Data

US 2025/0030454 A1      Jan. 23, 2025

(30) Foreign Application Priority Data

Jul. 21, 2023     (DE) ..................... 10 2023 206 929.6

(51) Int. Cl.
*H04B 3/54*            (2006.01)
*B60L 53/66*           (2019.01)

(52) U.S. Cl.
CPC ................ *H04B 3/54* (2013.01); *B60L 53/66* (2019.02)

(58) Field of Classification Search
CPC ........ Y02T 90/12; Y02T 90/14; Y02T 90/167
See application file for complete search history.

(56) References Cited

U.S. PATENT DOCUMENTS 7,715,971 B2 * 5/2010 Okuda ................ B60L 15/2027
                                                              701/93
8,278,875 B2 * 10/2012 Hagenmaier, Jr. ...... B60L 53/62
                                                              320/109
(Continued)

FOREIGN PATENT DOCUMENTS

CA          2740460 A1 * 11/2011   .............. B60L 53/66
CA          2740460 C  *  2/2014   .............. B60L 53/18
(Continued)

OTHER PUBLICATIONS

S. Köhler, S. Birnbach, R. Baker and I. Martinovic, "On the Security of the Wireless Electric Vehicle Charging Communication," 2022 IEEE International Conference on Communications, Control, and Computing Technologies for Smart Grids (SmartGridComm), Singapore, Singapore, 2022, pp. 393-398, (Year: 2022).*
(Continued)

*Primary Examiner* — Berhanu Tadese
(74) *Attorney, Agent, or Firm* — Muncy, Geissler, Olds & Lowe, P.C.

(57)             ABSTRACT

A device for communication of an electric or hybrid vehicle with an electric charging station via at least one data line. The device has at least one transmitter and at least one receiver. The transmitter transmits on n frequency channels with a defined transmit power. The receiver receives power from the charging station for the n frequency channels. The device has a control unit to continue or terminate communication with the charging station depending on the received power. The transmitter is designed to be able to increase the transmit power for the n frequency channels. If the received power falls below a first threshold value, the transmit power of the transmitter is increased for the n frequency channels and the transmitter transmits again on all n frequency channels and the receiver again receives the power from the
(Continued)

Legend:
1 - Device to communicate with Charging Station 2
2 - Charging Station
3 - Transmitter
4 - Receiver
5 - Control Unit
6 - Transmitter
7 - Receiver
8 - Control Unit
9 - Data Line charging station, as well as an associated communication method.

8 Claims, 1 Drawing Sheet

(56)                    References Cited

U.S. PATENT DOCUMENTS

| | | | | |
|---|---|---|---|---|
| 8,981,787 | B2 * | 3/2015 | Scheu | B60L 53/18 |
| | | | | 701/1 |
| 9,021,278 | B2 * | 4/2015 | Katar | B60L 53/67 |
| | | | | 713/300 |
| 9,465,064 | B2 * | 10/2016 | Roy | B60L 53/38 |
| 9,537,342 | B2 * | 1/2017 | Binder | H02J 7/0071 |
| 9,696,743 | B1 * | 7/2017 | Treichler | G05F 3/02 |
| 9,878,630 | B2 * | 1/2018 | Kaindl | B60L 53/66 |
| 10,131,242 | B2 * | 11/2018 | Marathe | B60L 53/65 |
| 10,137,794 | B2 * | 11/2018 | Logvinov | B60L 53/20 |
| 10,139,848 | B1 * | 11/2018 | Treichler | B60L 53/20 |
| 10,479,209 | B2 * | 11/2019 | Yabuuchi | H02J 7/00 |
| 10,654,364 | B2 * | 5/2020 | Logvinov | B60L 53/63 |
| 10,675,979 | B2 * | 6/2020 | Kim | B60L 53/305 |
| 11,603,004 | B2 * | 3/2023 | Bode | B60L 53/305 |
| 11,673,482 | B2 * | 6/2023 | Neitz | B60L 3/0069 |
| | | | | 320/109 |
| 11,802,919 | B2 * | 10/2023 | Underhill | B60L 53/68 |
| 11,881,659 | B2 * | 1/2024 | Wiegman | B60L 53/16 |
| 12,046,906 | B1 * | 7/2024 | Laskowsky | B60L 53/14 |
| 2007/0255477 | A1 * | 11/2007 | Okuda | B60K 6/442 |
| | | | | 701/93 |
| 2011/0279082 | A1 * | 11/2011 | Hagenmaier, Jr. | B60L 53/18 |
| | | | | 320/109 |
| 2013/0029595 | A1 * | 1/2013 | Widmer | B60L 53/124 |
| | | | | 455/39 |
| 2013/0038424 | A1 * | 2/2013 | Katar | B60L 53/67 |
| | | | | 340/5.8 |
| 2015/0189581 | A1 * | 7/2015 | Katar | H02J 13/00016 |
| | | | | 370/312 |
| 2016/0075245 | A1 * | 3/2016 | Logvinov | B60L 53/20 |
| | | | | 320/108 |
| 2016/0193934 | A1 * | 7/2016 | Marathe | B60L 53/14 |
| | | | | 320/137 |
| 2016/0327615 | A1 * | 11/2016 | Wallace | G01R 31/52 |
| 2019/0106010 | A1 * | 4/2019 | Logvinov | B60L 53/38 |
| 2023/0060928 | A1 * | 3/2023 | Wiegman | H01M 50/213 |
| 2023/0070814 | A1 | 3/2023 | Kim et al. | |
| 2024/0010095 | A1 * | 1/2024 | Shin | G06Q 50/06 |
| 2024/0042881 | A1 | 2/2024 | Schulz et al. | |
| 2024/0083289 | A1 * | 3/2024 | Bennett | B60L 53/305 |
| 2024/0375530 | A1 * | 11/2024 | Cui | B60L 53/16 |
| 2025/0030454 | A1 * | 1/2025 | Jackle | H04B 3/54 |

FOREIGN PATENT DOCUMENTS

| | | | | | |
|---|---|---|---|---|---|
| CA | 2878222 | A1 * | 2/2014 | | B60L 58/22 |
| CN | 101115638 | A * | 1/2008 | | B60K 6/48 |
| CN | 106740042 | A * | 5/2017 | | H02K 7/116 |
| CN | 107554318 | A * | 1/2018 | | B60L 53/66 |
| CN | 108649622 | A * | 10/2018 | | H02J 7/0031 |
| CN | 109895649 | A * | 6/2019 | | B60L 53/63 |
| CN | 110198031 | B * | 10/2020 | | H04W 4/30 |
| CN | 114527408 | A * | 5/2022 | | B60L 53/18 |
| CN | 107554318 | B * | 7/2022 | | B60L 53/18 |
| CN | 107696884 | B * | 7/2022 | | H02J 7/0042 |
| CN | 109895649 | B * | 12/2022 | | B60L 53/63 |
| CN | 115534742 | A * | 12/2022 | | B60L 53/305 |
| CN | 115817214 | A * | 3/2023 | | |
| CN | 116132547 | A * | 5/2023 | | H04L 69/08 |
| CN | 219133877 | U * | 6/2023 | | |
| CN | 117813213 | A * | 4/2024 | | H02J 7/0042 |
| CN | 119329357 | A * | 1/2025 | | B60L 53/31 |
| CN | 114527408 | B * | 7/2025 | | B60L 53/68 |
| DE | 102011056501 | A1 * | 6/2013 | | H04B 3/54 |
| DE | 102013205088 | A1 | 9/2014 | | |
| DE | 102013011593 | A1 | 1/2015 | | |
| DE | 102013214292 | A1 | 1/2015 | | |
| DE | 102016105269 | A1 * | 10/2016 | | F02D 41/221 |
| DE | 102016215717 | A1 * | 2/2018 | | B60L 53/66 |
| DE | 102018204565 | A1 * | 9/2019 | | B60L 53/66 |
| DE | 102021123536 | A1 * | 3/2022 | | H02J 7/0048 |
| DE | 102021126822 | A1 * | 5/2022 | | G01R 31/54 |
| DE | 102021106275 | A1 * | 9/2022 | | B60L 53/14 |
| DE | 102021121377 | A1 * | 2/2023 | | H02J 7/0042 |
| DE | 102021124860 | A1 * | 3/2023 | | H02H 3/332 |
| DE | 102021124869 | A1 * | 3/2023 | | B60L 53/18 |
| DE | 102021124888 | A1 * | 3/2023 | | B60L 53/60 |
| DE | 102021124894 | A1 * | 3/2023 | | H01B 7/32 |
| DE | 102021124917 | A1 * | 3/2023 | | B60L 53/62 |
| DE | 102021124930 | A1 * | 3/2023 | | B60L 53/18 |
| DE | 102021124937 | A1 * | 3/2023 | | B60L 53/302 |
| DE | 102022200789 | A1 | 3/2023 | | |
| DE | 102023113357 | A1 * | 11/2023 | | B60L 53/66 |
| DE | 102013205088 | B4 * | 1/2024 | | B60L 53/66 |
| DE | 112022000922 | T5 * | 2/2024 | | H02J 7/0013 |
| DE | 102011056501 | B4 * | 10/2025 | | G01B 7/02 |
| EP | 1863668 | B1 * | 10/2008 | | B60K 6/442 |
| EP | 2896105 | B1 | 8/2017 | | |
| EP | 3266646 | A1 * | 1/2018 | | B60L 53/65 |
| EP | 2958345 | B1 * | 4/2021 | | H02J 7/00047 |
| EP | 4000988 | A1 * | 5/2022 | | B60L 53/31 |
| EP | 2909912 | B1 * | 8/2022 | | B60L 53/38 |
| EP | 4000988 | B1 * | 7/2023 | | B60L 53/16 |
| EP | 4219225 | A1 * | 8/2023 | | B60L 53/66 |
| JP | 2016093078 | A * | 5/2016 | | |
| JP | 2018207775 | A * | 12/2018 | | H02J 50/12 |
| JP | 2025001106 | A * | 1/2025 | | H04L 67/12 |
| KR | 20220020485 | A * | 2/2022 | | H04L 9/3263 |
| KR | 20240058660 | A * | 5/2024 | | B60L 53/67 |
| KR | 102776536 | B1 * | 3/2025 | | B60L 53/67 |
| WO | WO-2006106894 | A1 * | 10/2006 | | B60W 10/06 |
| WO | WO-2011086697 | A1 * | 7/2011 | | B60L 53/65 |
| WO | WO-2013019566 | A1 * | 2/2013 | | B60L 53/126 |
| WO | WO-2014063159 | A2 * | 4/2014 | | G01V 3/10 |
| WO | WO2022061241 | A1 | 3/2022 | | |
| WO | WO-2022130010 | A1 * | 6/2022 | | B60L 53/14 |
| WO | WO-2022194596 | A1 * | 9/2022 | | |
| WO | WO-2023020947 | A1 * | 2/2023 | | H02J 7/0042 |
| WO | WO-2023046393 | A1 * | 3/2023 | | B60L 3/0069 |
| WO | WO-2023046397 | A1 * | 3/2023 | | H02H 3/347 |
| WO | WO-2023046399 | A1 * | 3/2023 | | B60L 3/0069 |
| WO | WO-2023046417 | A1 * | 3/2023 | | H01B 7/324 |

OTHER PUBLICATIONS

H. Klaina et al., "Aggregator to Electric Vehicle LoRaWAN Based Communication Analysis in Vehicle-to-Grid Systems in Smart Cities," in IEEE Access, vol. 8, pp. 124688-124701, 2020, (Year: 2020).*

M. S and P. Sivraj, "Development of Communication Simulator for Electric Vehicle Charging following ISO 15118," 2022 IEEE North Karnataka Subsection Flagship International Conference (NKCon), Vijaypur, India, 2022, pp. 1-6, (Year: 2022).*

S. Saadat, S. Maingot and S. Bahizad, "Electric Vehicle Charging Station Security Enhancement Measures, " 2020 5th IEEE Workshop on the Electronic Grid (eGRID), Aachen, Germany, 2020, pp. 1-8 (Year: 2020).*

ISO 15118-3, Road vehicles—Vehicle to grid Communicaiton Interface, First Ed., May 15, 2015 (Year: 2015).*

* cited by examiner

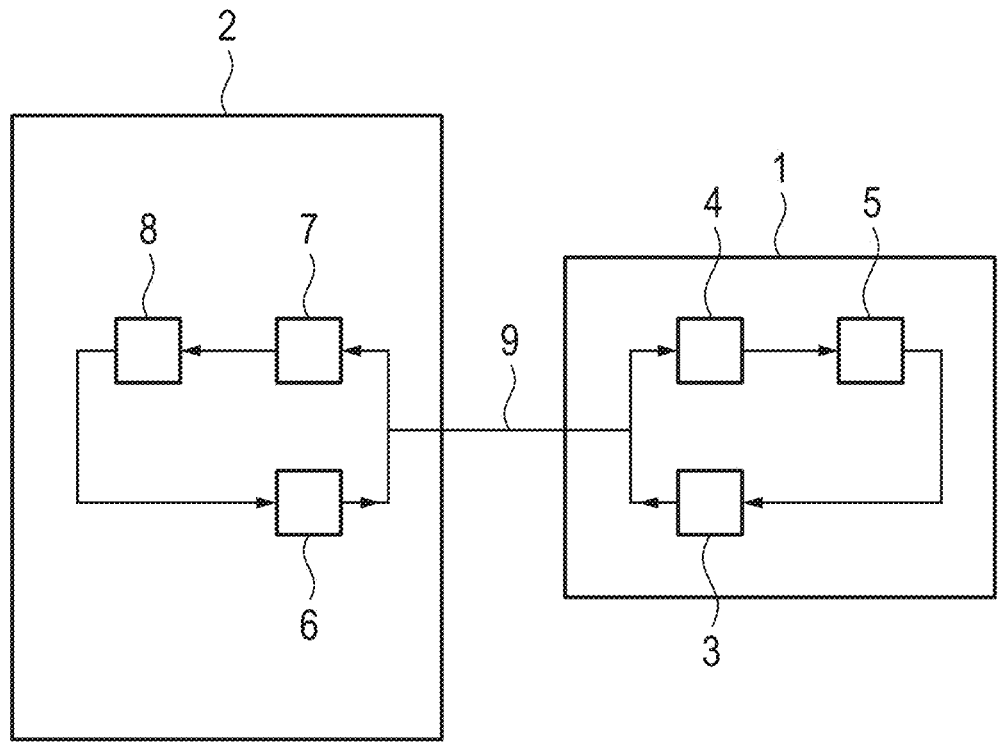
Legend:
1 - Device to communicate with Charging Station 2
2 - Charging Station
3 - Transmitter
4 - Receiver
5 - Control Unit
6 - Transmitter
7 - Receiver
8 - Control Unit
9 - Data Line

DEVICE FOR THE COMMUNICATION OF AN ELECTRIC OR HYBRID VEHICLE WITH AN ELECTRIC CHARGING STATION, AND COMMUNICATION METHOD

This nonprovisional application claims priority under 35 U.S.C. § 119 (a) to German Patent Application No. 10 2023 206 929.6, which was filed in Germany on Jul. 21, 2023, and which is herein incorporated by reference.

BACKGROUND OF THE INVENTION

Field of the Invention

The invention relates to a device for the communication of an electric or hybrid vehicle with an electric charging station and a communication method.

Description of the Background Art

Before the actual charging process takes place between the charging station and the vehicle, a comprehensive data exchange takes place, which is standardized, for example, in the International Organization for Standardization 151118 ("ISO15118") and the German Institute for Standardization 70121 ("DIN70121"). ISO15118 envisages HomePlug Green PHY as the physical layer for this purpose. This is a powerline communication protocol (PLC) derived from HomePlug AV.

In the context of International Organization for Standardization/International Electrotechnical Commission 15118 ("ISO/IEC 15118") high-level communication, the initial connection between the vehicle and the charging station is an essential event. Once a driver connects their vehicle to a charging station, the initial goal is to join a secure AV Logical Network (AVLN). Each AVLN is represented by a Network ID (NID). Furthermore, each participant in an AVLN needs a Network Membership Key that matches the NID for encrypted communication.

At the beginning of the communication setup, the vehicle sends an Ethernet broadcast message to all possible network participants. All charging stations that receive this signal respond with an Ethernet unicast confirmation. Because several charging stations can be connected to a physical supply line, the protocol is responsible for identifying the charging station in question to which the vehicle is connected. Due to undesirable couplings, other charging stations that are not physically connected to the vehicle can also be addressed. The HomePlug Green PHY therefore uses the so-called Signal Level Attenuation Characterization Mechanism (SLAC) to ensure that the connection is established correctly and securely. SLAC works according to the request-response method, wherein the request always comes from the electric vehicle. At the same time, the vehicle and the charging station agree on a RunID, a unique identification feature that must contain all subsequent messages from the same SLAC session.

The connection via SLAC goes through various stages one after the other, such as "Sounding Phase", "Attenuation Characterization Phase", "Validation Phase", "Matching Phase" and the "Amplitude Map Exchange Phase." By means of signal attenuations of varying strengths and with the help of the SLAC mechanism, the vehicle is thus able to identify to which one of the multitude of responding charging stations the vehicle is physically connected. At the end of this process, the electric vehicle and charging station form a common AVLN, through which the higher protocol layers exchange their information in encrypted form.

The attenuation characterization phase typically runs in such a way that a vehicle transmitter transmits on 1,150 carriers (frequency channels) between 1.8 and 30 MHz, wherein the transmission strength is fixed and has been set in a calibration step at the end of the motor vehicle's band. These carriers are recorded in turn by the signal level on the side of the charging station and sent back to the motor vehicle as measured values. It may also be provided that the charging station already combines measured values (e.g., two carriers), so that not 1,150 measured values, but only 575 measured values, for example, are transmitted back.

The received power at the charging station must exceed a certain level, otherwise communication is terminated.

For this purpose, an average value for the individual PSD values (Power Spectral Density) is typically determined and compared with a threshold value.

In particular, if the charging station is installed improperly, the attenuation can be too large, so that the charging station cannot be used.

SUMMARY OF THE INVENTION

It is therefore an object of the invention provide an improved device for the communication between an electric or hybrid vehicle and an electric charging station as well as to provide a corresponding communication method.

In an example, a device is provided for the communication of an electric or hybrid vehicle with an electric charging station via at least one data line that has at least one transmitter and at least one receiver. The transmitter is designed to transmit on n frequency channels with a defined transmit power, wherein n is preferably greater than 1,000 and is preferably 1,150. The at least one receiver is designed to receive power from the charging station for the n frequency channels that the charging station sends back to the motor vehicle. Furthermore, the device has a control unit that is designed to continue or terminate communication with the charging station depending on the received power. The transmitter is also designed to be able to increase the transmit power for the n frequency channels, wherein the control unit is further designed in such a way that, if the received power falls below a first threshold value, the transmit power of the transmitter for the n frequency channels is increased and the transmitter transmits again on all n frequency channels and the receiver again receives the power of the charging station. It should be noted that it may be provided that the transmit power of all n frequency channels is not increased, but only the frequency channels with a low received power. Preferably, however, the transmit power of all n frequency channels is increased. The increase in transmit power increases the probability of being able to carry out a charging process after all.

The charging station itself may increase its transmission strength when the received power is retransmitted, in order to ensure that the control unit reliably receives the transmitted received power despite the existing attenuation. Preferably, the increase in transmit power may be limited to a maximum value. It can be provided that the maximum permissible transmit power can always be transmitted during retransmission. Alternatively, it may also be provided that the charging station adjusts the transmit power depending on the power received at the charging station. At the latest after the end of a charging process, the charging station then resets to standard transmit power.

The device can be designed to interrupt communication if the received power is still below the first threshold value despite increased transmit power, i.e., the transmit power is increased only once.

The control unit can be designed to increase the transmit power by a value that corresponds to the fall below the first threshold value. The value preferably has a safety margin, which is, for example, greater by a certain absolute value or by a percentage markup (e.g., 5% or 10%) than the deviation from the first threshold value. So, it is not transmitted with the maximum possible transmit power, but only with adjusted transmit power due to the actual attenuation. This is particularly advantageous from an Electromagnetic Compatibility ("EMC") point of view, as otherwise the communication of other vehicles may be disrupted.

The control unit can be designed in such a way that an average value is formed from the received power, wherein the average value is compared with the first threshold value. This simplifies the evaluation compared to an individual evaluation over the n frequency channels or groups of frequency channels (e.g., the pairwise grouping in the charging station).

The control unit can be designed in such a way that communication is immediately interrupted if the received power also falls below a second threshold value, wherein the second threshold value is less than the first threshold value. This prevents an attempt to establish communication in the event of extreme attenuation with very high transmit power, which could lead to the EMC problems already described.

The device can be designed in such a way that the transmit power is set individually for each frequency channel or groups of frequency channels.

The device can be designed in such a way that the transmit power for all n frequency channels is adjusted by a single gain value.

The device can be designed in such a way that the transmit power is adjusted back to the defined transmit power after a charging process has been completed.

The communication method between an electric or hybrid vehicle and an electric charging station is carried out via at least one data line, wherein the electric or hybrid vehicle has a device with at least one transmitter and at least one receiver. The at least one transmitter transmits on n frequency channels one after the other with a defined transmit power. The charging station also has at least one transmitter and at least one receiver. The charging station receives the sent n messages and determines their respective reception power, which the charging station then sends back, wherein the reception power of two frequency channels, for example, can also be combined. The receiver of the device then receives the transmitted reception power from the charging station and transmits it to a control unit, wherein the control unit continues or terminates communication with the charging station depending on the power received. The control unit increases the transmitter's transmit power for the n frequency channels if the received power is below a first threshold value, wherein the transmitter then transmits again on the n frequency channels to the charging station and the receiver receives the reception power of the charging station again. With regard to the further design of the method, reference is made to previous versions of the device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a device for communication between a vehicle and an electric charging station.

DETAILED DESCRIPTION

The FIGURE shows a device 1 for communication between an electric or hybrid vehicle and an electric charging station 2.

The device 1 has at least one transmitter 3, at least one receiver 4 and one control unit 5. Similarly, the charging station 2 has at least one transmitter 6, at least one receiver 7 and one control unit 8. The device 1 and charging station 2 are connected to each other via the data line 9 of a charging cable, wherein the data line 9 is the pilot line, for example. The other lines of the charging cable are not shown. The control unit 5 controls the transmitter 3 in such a way that it transmits on n frequency channels with a defined transmit power one after the other. Preferably, n=1,150, wherein the frequency channels lie between 1.8-30 MHz. The receiver 7 of the charging station 2 receives these n messages and transmits them with the respective received power to the control unit 8, which then sends the received power back to the device 1 via the transmitter 6, wherein individual frequency channels can also be combined here. The received power is then received by the receiver 4 and transmitted to the control unit 5. The control unit 5 then determines an average spectral power density from the received power and compares this with a first threshold value. If the average spectral power density is above the first threshold value, communication continues. It may also be provided that the determination of the average spectral power density is carried out entirely in the charging station 2, so that it only transmits the average spectral power density to the device 1.

If, on the other hand, the determined average spectral power density is below the first threshold value but above a second threshold value, the transmit power for the n frequency channels is increased. Preferably, the transmit power is only increased as much as the received power is below the first threshold value. For example, if the received power was 10 dBm/Hz below the first threshold value, the transmit power is increased accordingly by 10 dBm/Hz, wherein preferably a certain safety margin is applied to the increase. The increase can be increased by a value in which an amplifier value AFC Gain is raised. Alternatively, the transmission strength of each frequency channel is increased individually by the determined value. The method is then repeated, i.e., the device 1 transmits with the increased transmit power on all n frequency channels and receives the received power at the charging station 2, which the charging station 2 then sends back. If the average spectral power density is then above the first threshold value, the communication continues. If, on the other hand, this is again below the first threshold, communication is interrupted. Likewise, the communication method is terminated immediately if the average spectral power density of the received signals is less than the second threshold value (e.g., 40 dBm/Hz below the first threshold value).

By adjusting the transmit power during operation, the availability of charging stations 2 can be increased in the event of communication problems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for the communication of an electric or hybrid vehicle with an electric charging station via at least one data line, the device comprising:

at least one transmitter to transmit on n frequency channels with a defined transmit power; and
   at least one receiver to receive received power from the charging station for the n frequency channels; and
   a control unit to continue or terminate communication with the charging station depending on the received power,
   wherein the transmitter is adapted to increase the transmit power for the n frequency channels,
   wherein the control unit is designed such that, when the received power falls below a first threshold value, the transmit power of the transmitter is increased for the n frequency channels and the transmitter transmits again on all n frequency channels and the receiver again receives the received power of the charging station, and
   wherein the device is designed to interrupt communication when the received power is still below the first threshold value despite an increased transmit power.

2. The device according to claim 1, wherein the control unit is designed to form an average value from the received power, and wherein the average value is compared with the first threshold value.

3. The device according to claim 1, wherein the control unit is designed such that communication is immediately interrupted when the received power also falls below a second threshold value, and wherein the second threshold value is less than the first threshold value.

4. The device according to claim 1, wherein the transmit power of the device is adjusted individually for each frequency channel or groups of frequency channels.

5. The device according to claim 1, wherein the transmit power of the device is adjusted by a single gain value for all frequency channels.

6. The device according to claim 1, wherein the device adjusts the transmit power back to the defined transmit power after completion of a charging process.

7. A device for the communication of an electric or hybrid vehicle with an electric charging station via at least one data line the device comprising:

at least one transmitter to transmit on n frequency channels with a defined transmit power; and
   at least one receiver to receive received power from the charging station for the n frequency channels; and
   a control unit to continue or terminate communication with the charging station depending on the received power,
   wherein the transmitter is adapted to increase the transmit power for the n frequency channels,
   wherein the control unit is designed such that, when the received power falls below a first threshold value, the transmit power of the transmitter is increased for the n frequency channels and the transmitter transmits again on all n frequency channels and the receiver again receives the received power of the charging station, and
   wherein the control unit is designed to increase the transmit power by a value corresponding to the fall below the first threshold value.

8. A communication method between an electric or hybrid vehicle and an electric charging station via at least one data line, the electric or hybrid vehicle has a device with at least one transmitter and at least one receiver, the method comprising:

transmitting, via the transmitter, on n frequency channels in succession with a defined transmit power;
   receiving, by the receiver, power from the charging station for n frequency channels, which the charging station sends to the receiver;
   continuing or terminating, via a control unit of the device, communication with the charging station depending on the power received; and
   increasing, via the control unit, the transmit power of the transmitter for the n frequency channels when the received power is below a first threshold value, the transmitter then transmits again on the n frequency channels to the charging station and the receiver again receives the power of the charging station,
   wherein the device interrupts the communication when the received power is still below the first threshold value despite an increased transmit power.

* * * * *